Dec. 7, 1926.  
J. E. McMILLAN  
1,609,651  
UNIVERSAL SAWING MACHINE  
Filed May 10, 1923 5 Sheets-Sheet 1
Saw may be arranged to oscillate as it reciprocates or to run straight. See Fig. 13, Sheet 5, & p. 3 ls 122 to 127.
See Class 143 Digest.
"Spring Urged Saw-Feed"
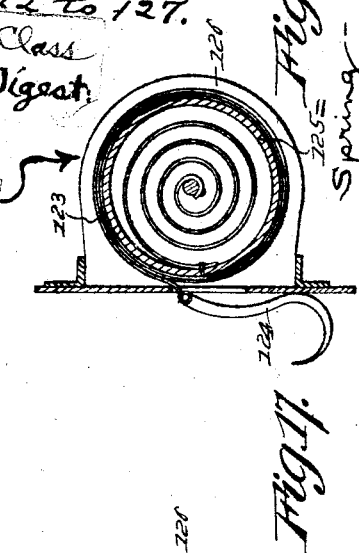
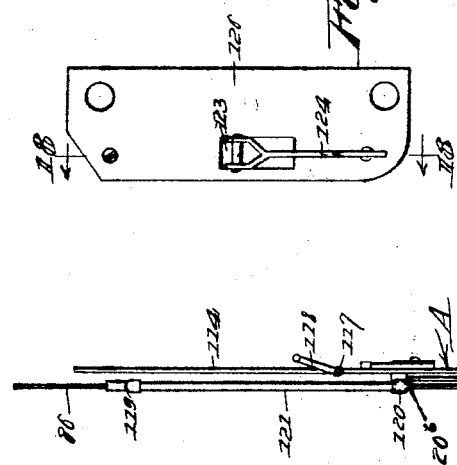
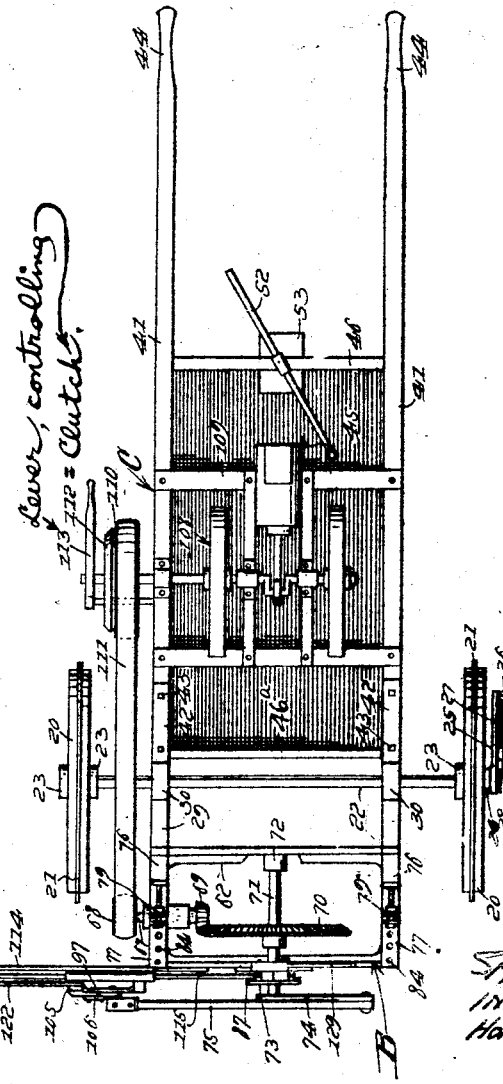
SAW CUTS IN VERTICAL OR HORIZONTAL PLANE
Inventor  
J. E. McMillan,  
By  
Attorney
Copy in 143-68-34

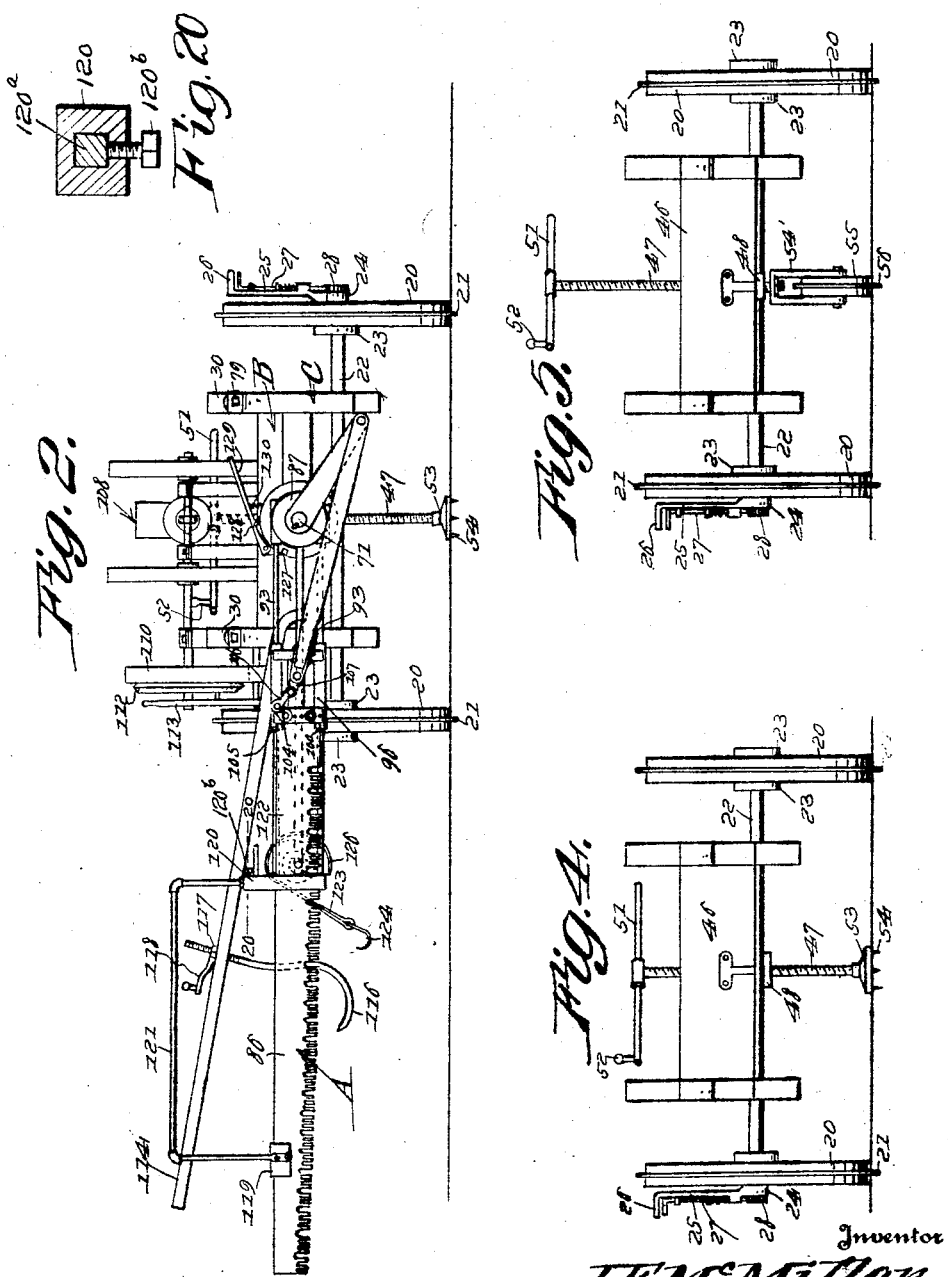

Dec. 7, 1926.  
J. E. McMILLAN  
UNIVERSAL SAWING MACHINE  
Filed May 10, 1923
1,609,651
5 Sheets-Sheet 3
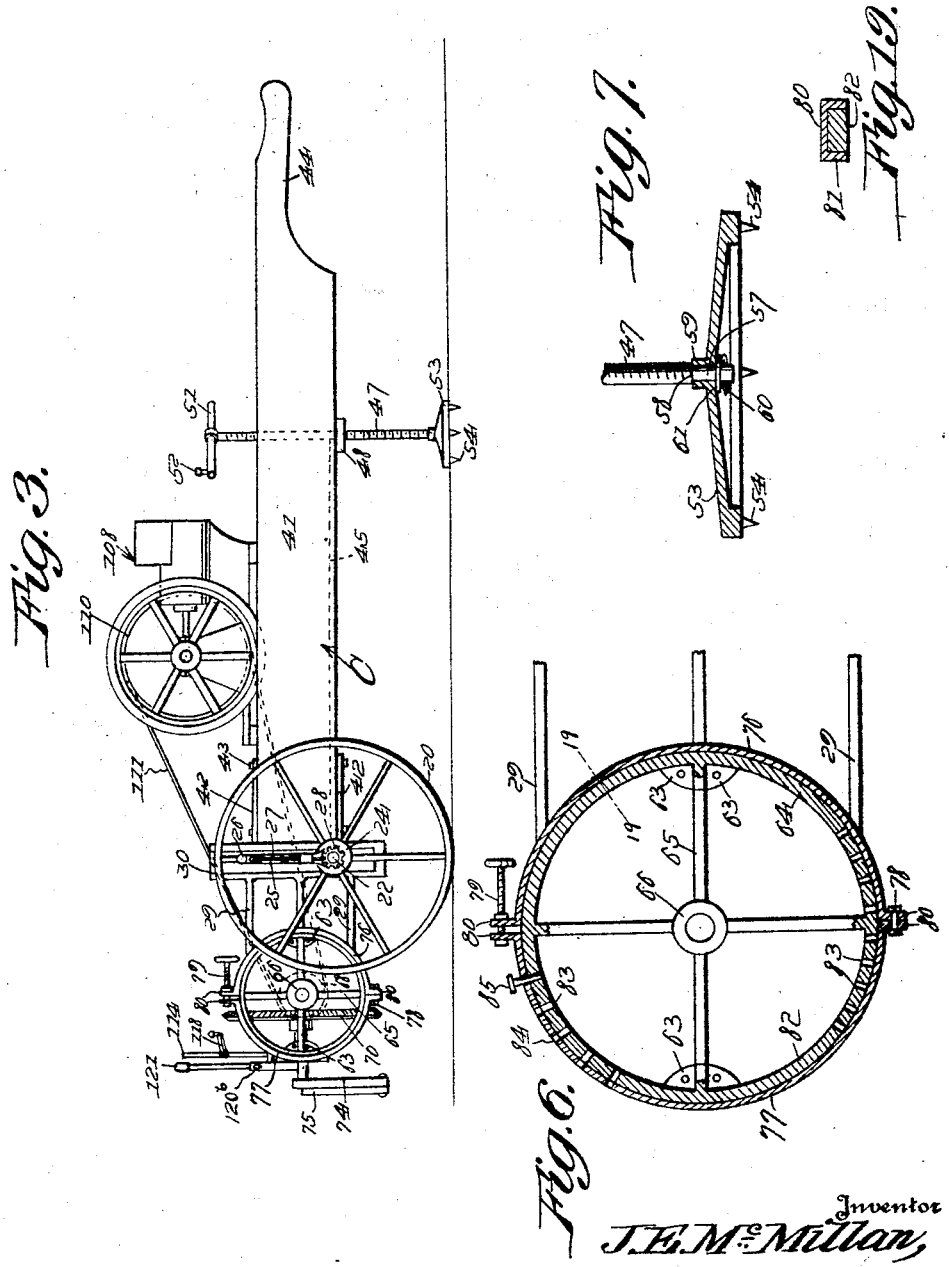
Inventor  
J. E. McMillan,
By  
Attorney

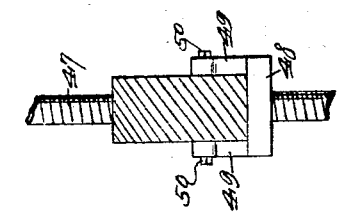
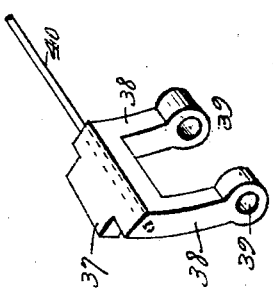
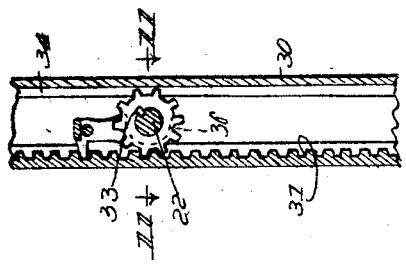
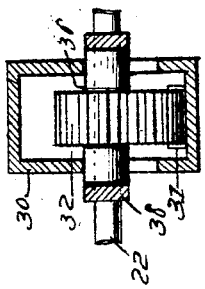
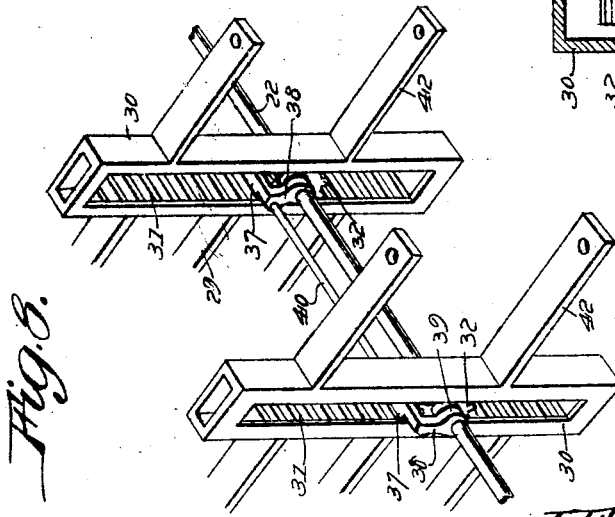

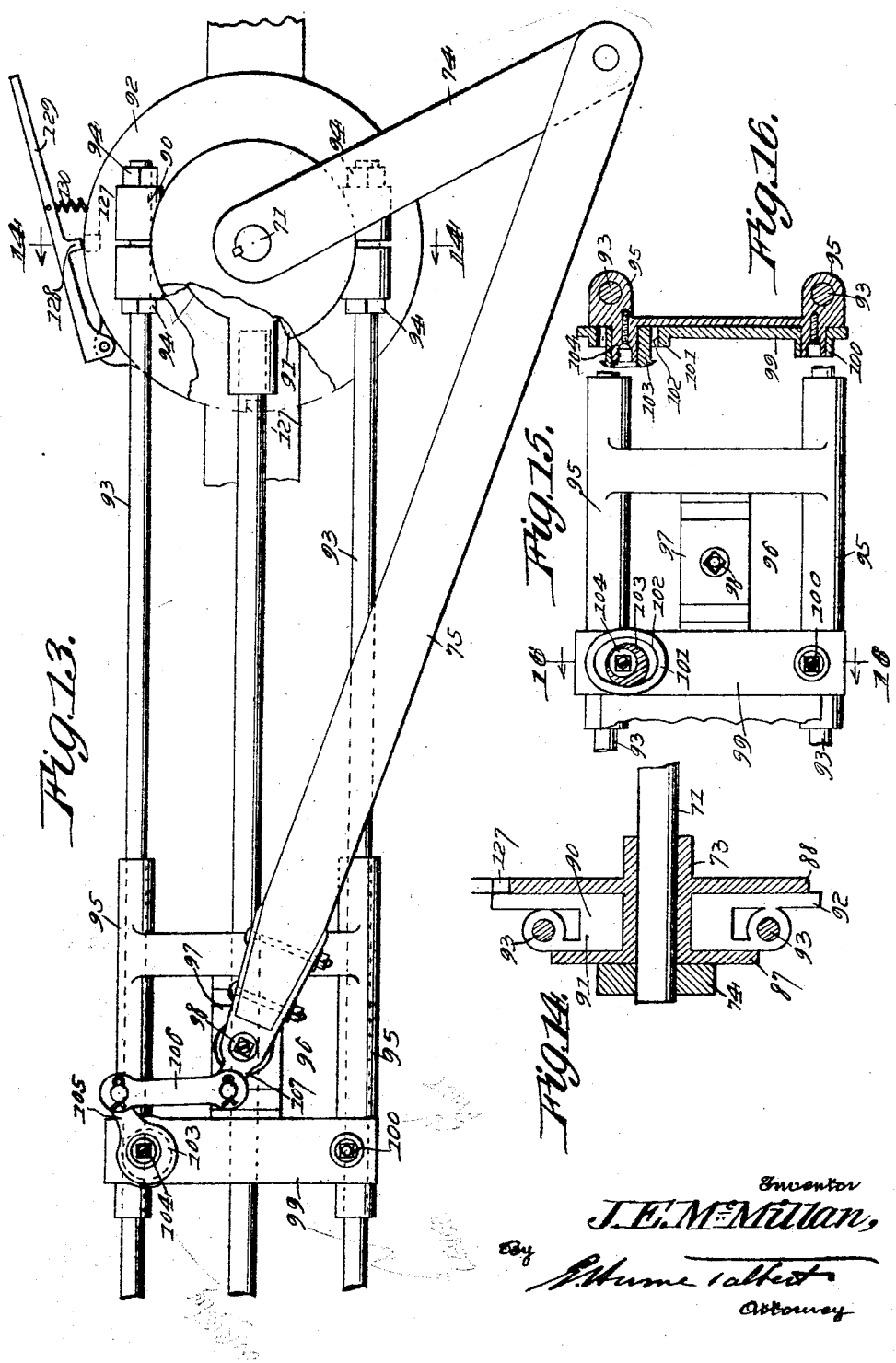

Patented Dec. 7, 1926.

1,609,651

UNITED STATES PATENT OFFICE.

JAMES E. McMILLAN, OF CHARLESTON, ILLINOIS.

UNIVERSAL SAWING MACHINE.

Application filed May 10, 1923. Serial No. 638,014.

The object of the invention is to provide a power driven cross-cut reciprocating saw and a transportable truck for the same with reference to which the saw is adjustable to dispose the latter in proper position to cut down standing timber and thereafter to properly adjust the saw to cut the fallen trunk up into the desired lengths.

A further object of the invention is to provide means in connection with the reciprocating mechanism, whereby the saw will be oscillated or rocked slightly during reciprocation, thus providing for cleaning the saw dust from the cut during the cutting operation.

A still further object is to provide means for anchoring the device as a whole to a fallen log or tree so that the saw may be held in proper position relative thereto to affecting the severing or cutting of the log without binding or choking the saw.

A still further object is to provide a spring actuated flexible anchor to effect the feeding of the saw in cutting down standing timber.

With these objects in view the invention consists in a construction and combination of parts of which a preferred embodiment is shown in the accompanying drawings, wherein:—

Figure 1 is a top plan view of the invention.

Figure 2 is a front elevational view.

Figure 3 is a side elevational view.

Figure 4 is a rear elevational view from which the saw structure per se is omitted, this view showing one form of rest for the rear end of the truck.

Figure 5 is a view similar to Figure 4 but shows a caster wheel constituting the support for the rear end of the truck.

Figure 6 is a detail view partly in section and partly in elevation illustrating the method of supporting of the saw carriage.

Figure 7 is a detail view partly in section and partly in elevation illustrating the foot plate or rest for the rear end of the truck.

Figure 8 is a detail perspective view of that portion of the carriage frame connecting with the truck axle.

Figure 9 is a central vertical sectional view through one of the guides of the carriage frame.

Figure 10 is a view partly in section and partly in elevation showing the method of connecting the adjusting screw constituting a part of the rear support of the truck.

Figure 11 is a section on the line 11—11 of Figure 9.

Figure 12 is a perspective view illustrating one of the locking pawls used in connection with the axle and carriage frame guides.

Figure 13 is a detail view in elevation but partly broken away illustrating the swivel head and associated guide rod of the cross head of the saw.

Figure 14 is a sectional view taken on the plane indicated by the line 14—14 of Figure 13.

Figure 15 is an enlarged detail elevational view of the cross head.

Figure 16 is a section on the line 16—16 of Figure 15.

Figure 17 is a front elevation of the spring actuated anchor and feed for the saw employed in cutting down standing timber.

Figure 18 is a section on the line 18—18 of Figure 17.

Figure 19 is a section on the line 19—19 of Figure 6.

Figure 20 is a section on the line 20—20 of Figure 2.

The invention embodies the three essential elements, the reciprocatory saw A, the carriage and frame B and the truck C. The truck is supported by the wheels 20 which are formed with peripheral centrally disposed flanges 21 adapted for penetration in the ground to prevent sidewise or oscillating movement of the truck, the wheels being carried on the axle 22 on which they are freely rotatable, the one being prevented from sidewise or movement longitudinally of the axle by means of hub plates 23 disposed on opposite sides of the wheel and the other being similarly prevented from movement longitudinally of the axle by one hub plate 23 and the hub 24 of a hand lever 25, the latter having a crank handle 26 by which the lever may be turned and the lever being provided with a spring actuated latch 27 engageable with a toothed wheel or gear 28 carried by the extremity of the axle 22. Since the wheels are mounted for free rotary movement on the axle, the latter may be rotated by the rotation of the lever 25 when the latch is engaged with the toothed wheel 28 and the purpose of this arrangement is to elevate the truck with reference to the ground or surface on which the machine is standing. To this end the carriage frame 29 at the rear end is provided with rectangular box guides 30 which, interiorly, on one face are provided with the rack teeth 31 traversed by the pinions 32 carried on the axle 22 and secured to the latter to preclude relative angular or turning movement, such as by keys 33. The opposite sides of the guides are channel-shaped, as indicated at 34, and in order that the pinions may be kept in mesh with the racks 31, they are provided with hub extensions 36 having bearing contact with the free edges of the flanges of the channels. Obviously turning movement imparted to the axle by the lever 25 will cause the pinions to traverse the racks and thus elevate or lower the carriage frame 29 and with it all those parts constituting the truck frame and saw. It is essential that some means be provided for latching the carriage frame in position when the desired elevation of the same has been obtained and such means constitute pawls 37 provided with spaced arms 38 which straddle the pinions 32 and are provided with eyes 39 through which the axle passes, the eyes permitting pivotal movement of the pawls with reference to the axle so that the noses of the pawls may be engaged with or disengaged from the teeth of the rack 31. In order that the two pawls may be operated in synchronism or unison, they are interconnected by a rod 40. So long as the pawls engage the teeth of the rack 31, the weight of the carriage frame and the connected parts is transferred to them and from them to the axle and to the truck wheels. When it is desired to adjust the slide of the carriage frame and truck, the lever 25 is operated, the first movement taking the weight of the carriage frame off the pawls when they may be disengaged from the rack teeth and swung over towards the channels of the guide, when continued rotation of the lever 25 will affect the desired adjustment of the carriage frame which, when obtained, may be retained by the re-engagement of the pawls with the teeth of the rack. The lever 25 may be turned around in the operation or the operation may be intermittent by moving the lever through a short arc and then engaging the pawls of the rack after which the lever is released from operative connection with the axle by the disengagement of the latch 27 and moved to a more convenient position after which the re-engagement of the latch affects the necessary operative connection for a further angular movement of the axle and a further adjustment of the carriage frame.

With the carriage frame there are connected the side sills 41 which at their forward ends are disposed between spaced arms 42 formed integral with the carriage frame, bolts 43 extending through the arms and through the sills to secure the latter to the arms. The sills at the rear ends are terminated in hand grabs or handles 44 to permit the manual transportation of the truck or positioning it properly for the work in hand and on the bottom edges are spanned by the floor board 45 which extends from the carriage frame to a cross bar 46, the latter, the frame, and a head board 46ª constituting the side walls and the floor boards constituting the bottom of a box or compartment in which tools and implements necessary to the handling of the device may be readily carried.

The truck at the rear end is supported by a screw 47 which passes loosely through the cross bar 46 but threadingly engages a plate 48 having ears 49 disposed on opposite sides of the bar and connected to the latter by appropriate fastening means such as lag screws 50. To provide for the easy turning of the screw, it is equipped at the upper end with a cross bar 51 at one extremity of which is carried a crank handle 52, the lower end of the bar having a pivotal connection with a foot plate 53 on the under face of which are provided spurs 54 for engagement with the ground. The screw is designed for selective attachment with the foot plate or with the yoke 54 of a castor wheel 55, the latter being provided with a central peripheral flange 56 functioning as the flanges 21 on the ground wheels 20. The pivotal connection provided for connecting the screw with the foot plate or with the castor wheel yoke is obtained by reducing the diameter of the screw at the lower end as indicated at 57 to provide a shoulder 58 which may rest on the upper edge of the hub 59 of the foot plate or on the transverse portion of the yoke, the extremity of the reduced end being formed with a transverse hole or eye for the reception of a cotter pin 60 above which is carried a washer 61. The replacement of the foot plate with the castor wheel consists merely in the removal of the cotter pin and washer and the placing of the yoke on the lower end of the screw and the re-attachment of the washer and cotter pin.

The carriage frame at the forward end supports the saw carriage which consists of the rectangular frame 62 bolted or otherwise secured at its ends to ears 63 disposed on diametrically opposite sides but on the inner peripheries of rings 64 which are supported on spiders 65 of which one carries a bearing 66 in which is journaled the shaft 67 carrying at one end a pulley 68 and at the other end and in the frame the bevel pinion 69, the latter meshing with a bevel gear 70 carried within the carriage frame and mounted on a shaft 71 which spans the carriage frame transversely and is journaled in bearings 72 and 73, the shaft 71 extending through the latter bearing and carrying exterior to the carriage frame the crank arm 74 to which one end of the pitman 75 is connected, the pitman constituting the means for reciprocating the saw. The carriage is designed for adjustment to dispose the shaft 71 parallel with the ground or supporting surface or at any angle between that and perpendicularity with the supporting surface and to this end the rings 64 are engaged by complemental clamping elements 76 and 77 of which the former are formed integral with the carriage frame 29 and the latter secured to the former at the bottom by bolts 78 and at the top by clamping screws 79, the clamping elements or straps 76 and 77 being formed with out-turned ears 80. In order to ensure against movement of the rings 64 laterally with respect to the clamping elements or straps 76 and 77, the latter are channel shaped as clearly shown in Figure 19. the flanges 81 straddling centrally disposed ribs 82 formed on the outer peripheries of the rings 64. Obviously when the clamping screws 79 are loosened, the rings may be rotated in the straps 76 and 77 and the desired adjustment of the carriage angularly thus obtained and in order to provide for definite or fixed angular positions of the carriage, both the rings 64 and straps 77 are formed with apertures or perforations 83 and 84 of which any perforation or aperture 83 may be registered with any perforation or aperture 84 to obtain a definite angular position of the saw frame, pins 85 being provided for insertion in registering apertures to insure the fixed position prior to the tightening of the clamping screws 79.

The saw blade 86 has a pivotal mounting on the carriage and is also mounted for reciprocating movement on the pivotal mounting. The forward bearing 73 is extended through the front side of the frame of the carriage and is provided at its extremity with a disk 87, the frame of the carriage being enlarged or widened around the bearing to provide a rear disk 88. Between the disks 87 and 88 in surrounding relation to the bearing 73 there is carried the swivel head of the saw consisting of the complemental members 90 which constitute a hub and which are formed with the forward and rear disks 91 and 92 corresponding in diameter to the disks 88 and 87 respectively. The complemental members are secured together by the guide rods 93 the rear extremities of which are reduced and passed through eyes formed in said members, the reduced extremities of the guide rods receiving the nuts 94. The complemental members are thus secured together in surrounding relation to the bearing and the rods held in parallelism for sliding engagement with the sleeves 95 of the cross head 96. the bridge 97 of which carries the wrist pin 98 with which that extremity of the pitman 75 remote from the end connecting with the crank arm is pivotally connected. Obviously the rotation of the shaft 71 will rotate the crank arm 74 and reciprocate the cross head on the guide rods 93, the saw being carried by the cross head, will reciprocate the saw. Since the complemental members 90 provide a swivel connection for the cross head and the saw carried thereby, if the shaft 71 be disposed in parallelism with the ground or supporting surface, the weight of the saw will carry it through the work as the saw is reciprocated. In other words the saw will be fed to the work by gravity, the cutting operation being accomplished in the reciprocation of the saw. If the work be disposed in a plane not parallel with the truck, the saw carriage, by means of the adjusting straps 76 and 77 may be disposed to properly position the saw with the width of the same at right angles to the length of the log so as to cut the latter off straight and not at an angle. Obviously the wide range of adjustment of the carriage provides for all variations of the angle of the width of the saw with respect to the truck frame to obtain the desired position of the saw.

In order that the saw may be oscillated or rocked during the reciprocation, the saw at the heel, is attached or secured to the lever 99 which is pivotally mounted at its lower end as at 100, the pivot point being directly in front of the lower guide rod. The upper end of the lever is formed with an enlarged irregular eye 101 the inner periphery of which constitutes the cam face 102 with which the eccentric 103 may engage, the eccentric being pivotally mounted on a wrist pin 104 and having a laterally extending ear 105 with which a link 106 pivotally connects, said link 106 being also pivotally connected with an ear 107 formed as a part of and extending from the forward end of the pitman 75. The rotation of the crank arm 74 in imparting reciprocating movement to the cross head through the pitman per force oscillates the latter at the pivotal connection with the cross head and thus oscillates the eccentric 103 with the result that the lever 99 is moved forwardly on one stroke and rearwardly on the opposite stroke. Simultaneously with this the saw is rocked or oscillated, the degree of movement being the greatest at the time the saw finishes one stroke and begins another which arrangement facilitates the cleaning of the cut by the ejection of the dust therefrom, thereby precluding choking of the saw. Should occasion demand it, a straight reciprocating movement minus oscillatory movement can be had simply by the removal of the link connection 106 between the pitman and the eccentric ear 105.

Any acceptable means for driving the saw may be employed. At present a gasoline motor is deemed the preferable and such a motor as indicated at 108 is mounted on transverse bars 109 spanning the sills 41, the shaft of the motor carrying a pulley 110 which is traversed by a belt 111, the latter also traversing the pulley 68 to communicate motion to the bevel pinion 69. A clutch 112 is provided and operated by a lever 113 by means of which the pulley 110 may be operatively connected with or disconnected from the motor shaft.

When the machine is being employed for cutting off fallen timber it is essential that some means be provided to hold the saw to the work, that is to prevent lateral movement of the same and to this end there is provided an anchor bar 114 which is detachably secured, as by bolts 115 to the carriage, the anchor bar carrying a hook 116 the shank of which passes through the anchor bar 114 and is threaded for engagement with a nut 117 abutting the anchor bar on the top and being rotatable by means of a crank handle 118.

In order to reinforce the saw against bending strains, the forward and rear guides 119 and 120 are provided, being interconnected, with a yoke frame 121 and the rear guide being supported from the pivotal mounting of the saw by means of a bar 122, the rear end of which is seated in an appropriate socket formed in one of the complemental elements 90.

When it is desired to cut down standing timber the saw is positioned with its width substantially parallel with the supporting surface of the truck so that the width may be perpendicular with the tree or stump to be cut down. Such adjustment is of course effected by the rotation of the carriage in its support in the carriage frame which positions the saw for swinging movement in a horizontal plane. In order that it may be fed to the work in such a position, a flexible anchoring means is provided in the form of a metallic strap 123 provided with a terminal hook 124 and reeled on a spring actuated spool 125 which is carried in a housing 126, the latter being supported on the rear guide 120. When the saw is positioned for taking down standing timber the strap 123 is unreeled from the spool and the hook secured to the stump or tree at a point diametrically opposite the point engaged by the cutting edge of the saw. The springing tendency of the strap then serves to feed the saw through the work, the strap being reeled on the spool as the cutting operation progresses.

When the machine is not in use and it is desired to transport the same from place to place or to place it in storage, it is possible to fold the reciprocating saw on to the truck. The swivel mounting of the saw on the carriage provides for raising the saw with its length vertical to the supporting surface on which the truck is carried and in order that it may be latched in this position, the disks 91 and 88 are provided with registering notches 127 with which a tongue 128 may engage, the tongue being formed as an integral part of a lever 129 which is pivotally connected with the disk 88 and is actuated by a spring 130 to draw the lever towards the periphery of the disk for the engagement of the tongue with the notches. With the saw in such vertical position, the carriage may be rotated on its mounting in the frame to fold the saw down on top of the truck.

In order that the yoke frame may be readily disconnected so that it may be removed to permit the driving of a wedge or similar cut spreading device, the rear guide 120 in its upper end is provided with a cross-sectionally angular socket in which a correspondingly shaped shank $120^a$ engages, the guide carrying the set-screw $120^b$ for bearing engagement with the shank. This construction is clearly shown in detail cross section illustrated in Figure 20 and it is obvious that the loosening of the set-screw will permit the removal of the yoke and the forward guide when desired.

Having described the invention, what is claimed as new and useful is:—

1. A machine for the purpose indicated having a reciprocating saw, a truck supporting the same, a motor carried by the truck and operatively connected with the saw, a wheel supported axle, the truck being provided with vertically arranged spaced guides through which the axle passes, racks carried in said guides, pinions carried on the axle and engaging the racks, manual means for rotating the axle, and latching pawls carried by the axle and engageable with the teeth of the racks.

2. A machine for the purpose indicated having a reciprocating saw, a truck supporting the same, a motor carried by the truck and operatively connected with the saw, a wheel supported axle, the truck being provided with vertically arranged spaced guides through which the axle passes, racks carried in said guides, pinions carried on the axle and engaging the racks, manual means for rotating the axle, latching pawls carried by the axle and engageable with the teeth of the racks, the guides opposite the racks being formed with channels, and shoes swingingly secured to the axle and having sliding engagement in said channel.

3. A machine for the purpose indicated comprising a reciprocatory saw, a mounting pivotally supporting the same, a carriage supporting said mounting, and a carriage frame, the latter being provided with complemental clamping straps and the carriage being provided with head rings encircled by said straps and rotatable in the same when the latter are loosened.

4. A machine for the purpose indicated comprising a reciprocatory saw, a mounting pivotally supporting the same, a carriage supporting said mounting and consisting of a frame having head rings at opposite ends, a carriage frame, complemental clamping straps arranged in pairs, of which one of each pair is carried by the carriage frame, with the second strap of the pair bolted to the first, and hand operated clamping screws securing the straps of each pair together.

5. A machine for the purpose indicated comprising a reciprocatory saw, a mounting pivotally supporting the same, a carriage supporting said mounting and consisting of a frame having head rings at opposite ends, a carriage frame, complemental clamping straps arranged in pairs, of which one of each pair is carried by the carriage frame, with the second strap of the pair bolted to the first, hand operated clamping screws securing the straps of each pair together, one of the straps of one pair being provided with perforations and the corresponding head ring being provided with perforations adapted for registration with the perforations in the strap, and a pin inserted in the registrable perforations.

6. A machine for the purpose indicated having a reciprocating saw, a mounting for pivotally supporting the same, a carriage supporting the said mounting, a truck supporting the carriage, and a latch carried by the carriage and engageable with the mounting to support the saw with its length perpendicular to the truck, said carriage being adjustable in the truck to dispose the saw in folded relation and in substantial parallelism with the truck.

In testimony whereof he affixes his signature.

JAMES E. McMILLAN.